United States Patent
Nguyen et al.

(10) Patent No.: US 10,959,277 B2
(45) Date of Patent: Mar. 23, 2021

(54) MOBILE DEVICE NETWORK PERFORMANCE RESTORATION AND IMPROVEMENT

(71) Applicant: T-Mobile USA, Inc., Bellevue, WA (US)

(72) Inventors: Alex Thanh Nguyen, Bellevue, WA (US); Jaunani Sriramachandran, Bellevue, WA (US); Boua Thong Lor, Renton, WA (US)

(*) Notice: Subject to any disclaimer, the term of this patent is extended or adjusted under 35 U.S.C. 154(b) by 179 days.

(21) Appl. No.: 16/372,199

(22) Filed: Apr. 1, 2019

(65) Prior Publication Data

US 2020/0314938 A1 Oct. 1, 2020

(51) Int. Cl.
*H04W 76/18* (2018.01)
*H04W 4/14* (2009.01)
*H04W 8/12* (2009.01)
*H04L 29/12* (2006.01)
*H04B 17/318* (2015.01)

(52) U.S. Cl.
CPC .......... *H04W 76/18* (2018.02); *H04B 17/318* (2015.01); *H04L 61/3075* (2013.01); *H04W 4/14* (2013.01); *H04W 8/12* (2013.01)

(58) Field of Classification Search
CPC ......... H04W 76/18; H04W 4/14; H04W 8/12; H04W 76/19; H04W 24/08; H04L 61/3075; H04B 17/318
See application file for complete search history.

(56) References Cited

U.S. PATENT DOCUMENTS

| | | | | |
|---|---|---|---|---|
| 6,671,883 B1* | 12/2003 | Rahman | ............... | H04L 12/2801 348/E7.069 |
| 8,145,186 B1* | 3/2012 | Vaughan | ............... | H04W 24/08 455/405 |
| 2008/0049650 A1* | 2/2008 | Coppage | ............... | H04W 24/08 370/310 |
| 2008/0057868 A1* | 3/2008 | Chang | .................. | H04B 17/318 455/41.2 |
| 2013/0346788 A1* | 12/2013 | Haddad | ............... | H04L 12/5692 714/4.2 |
| 2019/0059117 A1* | 2/2019 | Shu | ...................... | H04W 76/50 |
| 2019/0189246 A1* | 6/2019 | Colavin | .................. | H04L 67/10 |
| 2020/0014747 A1* | 1/2020 | Rostami | ............... | H04L 67/101 |

* cited by examiner

*Primary Examiner* — Will W Lin
(74) *Attorney, Agent, or Firm* — Lee & Hayes, P.C.

(57) ABSTRACT

A method for diagnosing and improving mobile device connectivity in a network includes executing an instruction set stored on a read-only memory (ROM) of a mobile device to perform a first device performance evaluation associated with services on the mobile device that include a short message service (SMS), a multimedia messaging service (MMS), a voice calling service, and a mobile data service. The device identifies a hardware performance deficiency based at least in part on the first device performance evaluation, and issues at least one command to alter a device component setting on the device. The command is configured to alter a setting associated with the hardware performance deficiency. The device performs a second device performance evaluation, and determines whether the hardware performance deficiency is abated. The device generates a message to a network server indicative of a connectivity failure when the hardware performance deficiency is not abated.

20 Claims, 6 Drawing Sheets

MOBILE DEVICE NETWORK PERFORMANCE RESTORATION AND IMPROVEMENT

BACKGROUND

Cellular communication providers may maintain large infrastructures for providing wireless data communications for mobile devices. A cellular services infrastructure can include geographically distributed base stations as well as centralized communication services. For management of a large services infrastructure, a provider may use a network fault management system to monitor and respond to network outages, impairments, and other malfunctions. A network fault management system can be configured to receive information from different parts of a network infrastructure and to present information regarding network status to network administrators. A mobile device application may also work as part of the large services infrastructure. Some device-ran applications may evaluate device functionality and network connectivity, and respond to network outages, impairments, and other malfunctions. Conventional mobile device applications may not have access to some settings on the mobile device, which can limit remedies that may be performed by the application or off-device mechanisms.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure includes techniques and arrangements for mobile device-driven diagnosis and remediation of network connectivity and performance deficiencies as the mobile device operates on a cellular communications network. A performance enhancement system may be configured to operate from the read-only memory (ROM) of a mobile device. The performance enhancement system can include a performance evaluation engine and a performance correction engine. The performance evaluation engine may perform evaluation steps from the mobile device, and issue commands to a fault management system operating on one or more network server(s) to perform network-based evaluation steps. The performance correction engine may correct performance deficiencies on the mobile device.

The performance enhancement system operating on the mobile device processor may have access to additional device settings that are not accessible by conventional performance improvement applications, because the program instructions are issued from the ROM of the mobile device, and more particularly, from the device booting mechanism. The ROM-based instructions executed by the mobile device processor can provide a mechanism for the mobile device to change operational characteristics in ways that would not be possible using conventional device-executed applications. Conventional self-help applications for correcting network performance malfunctions are stored on the working memory of the mobile device (e.g., the random-access memory), which limits how the application can change operational aspects of the mobile device. Stated another way, some device settings are inaccessible to conventional applications. Operational characteristics that may not be changed automatically via application commands can include, for example, unblocking an International Mobile Equipment Identity (IMEI) number on the device, performing a master reset operation on the mobile device, enabling or disabling communications settings on the mobile device such as Wi-Fi calling, airplane mode, mobile data, data roaming, and modifying cellular network preferred settings on the mobile device, among others.

According to embodiments described herein, the performance evaluation engine operational on the mobile device may be executed from the device ROM, which allows the processor to diagnose and remedy hardware performance deficiencies by device-driven remediation steps executed by the mobile device, and by network-driven remediation steps that are commanded by the mobile device, routed through network-based infrastructure such as network server(s) or other mechanism, and finally performed on the mobile device hardware and/or on the network infrastructure at issue. By evaluating signal strength, examining SMS transmission error data, dropped call data, and other metrics, the performance evaluation engine may perform diagnostic steps on the mobile device. The performance evaluation engine may also issue commands to the network server(s) to perform network-based diagnostic steps and report back to the mobile device with hardware performance-related data.

The fault management system of the cellular communications network, which may be operational from one or more network servers, may receive fault data from multiple parts of a cellular network infrastructure. For example, the network management system may receive fault data from components of the cellular network (Radio Access Networks (RANs), backhauls, Evolved Packet Cores (EPCs), data centers, and an IP Multimedia Subsystem (IMS) core. The data may identify faults, or the network server(s) may analyze the data to identify faults, and report to the performance evaluation engine operating on the mobile device.

The performance evaluation engine on the mobile device can be operable with a performance correction engine also executed from the ROM of the mobile device, to correct hardware performance deficiencies based on the evaluations performed locally on the mobile device, performed by the fault management system on the network server(s), and/or by the original equipment manufacturer (OEM) server(s). The performance correction engine may be configured to change operational characteristics of the mobile device either directly, by accessing hardware component settings on the mobile device, and/or by issuing commands to the network server(s) to alter the component settings and/or network settings remotely (e.g., via commands issued from the network server(s)). In some aspects, devices from various OEM sources may have different capabilities and/or management settings that can uniquely affect operational characteristics managed. Accordingly, component settings and/or network settings may differ between various types of devices, different OEMs, and other factors such as agreement between the network and OEMs for access to the OEM server(s).

In some embodiments, hardware deficiencies may be diagnosed and remedied by the performance evaluation and correction engine(s) operating on the mobile device. In other aspects, after a follow-up performance evaluation conducted by the performance evaluation engine, it may be determined that the hardware performance deficiency was not abated by altering the network settings and/or by altering the hardware settings on the mobile device. The performance correction engine on the mobile device may be configured to generate a message to the network server(s). The generated message may include a help ticket that identifies the mobile device and any outstanding performance deficiencies that can be further handled by a cellular network technical administrator.

In some cases, a test may involve commanding one or more of the cellular communication devices to execute an application. The application might be one that relies, for at least a portion of its functionality, on communicating through the cellular communications network. The application, in some aspects, may be a consumer application that is commercially available to users, where the consumer application is pre-installed to the ROM on their personal wireless devices. Accordingly, the tests may involve executing multiple different consumer applications on one or more cellular communication devices to test for compatibility with the cellular communications network and to test functions that rely on cellular network communications. For example, different applications might rely on different servers for their operation, and running the different applications may reveal whether any of those servers, or their associated infrastructure, are malfunctioning and/or operating with diminished functionality.

Embodiments of the present disclosure may enhance user experience of an individual operating a mobile device on a cellular communications network by independently (without user interaction, or with limited user interaction) diagnosing and performing remediation steps on the mobile device. The remediation steps performed by the system may improve functionality of a mobile device by modifying the mobile device hardware settings and network-controlled hardware settings to improve how the mobile device operates with the communications network.

Embodiments of the present disclosure may also improve the functionality of a computer by altering hardware settings on the mobile device, and/or commanding network infrastructure to alter hardware settings within the network infrastructure. The improvements to computer functionality can include improved and/or restored data connectivity between the mobile device and the network infrastructure (e.g., increases in data throughput, resilience of data connections, improvement in signal strength, increased reliability of data, voice, small message service, multimedia message service, etc.).

Figure 1:
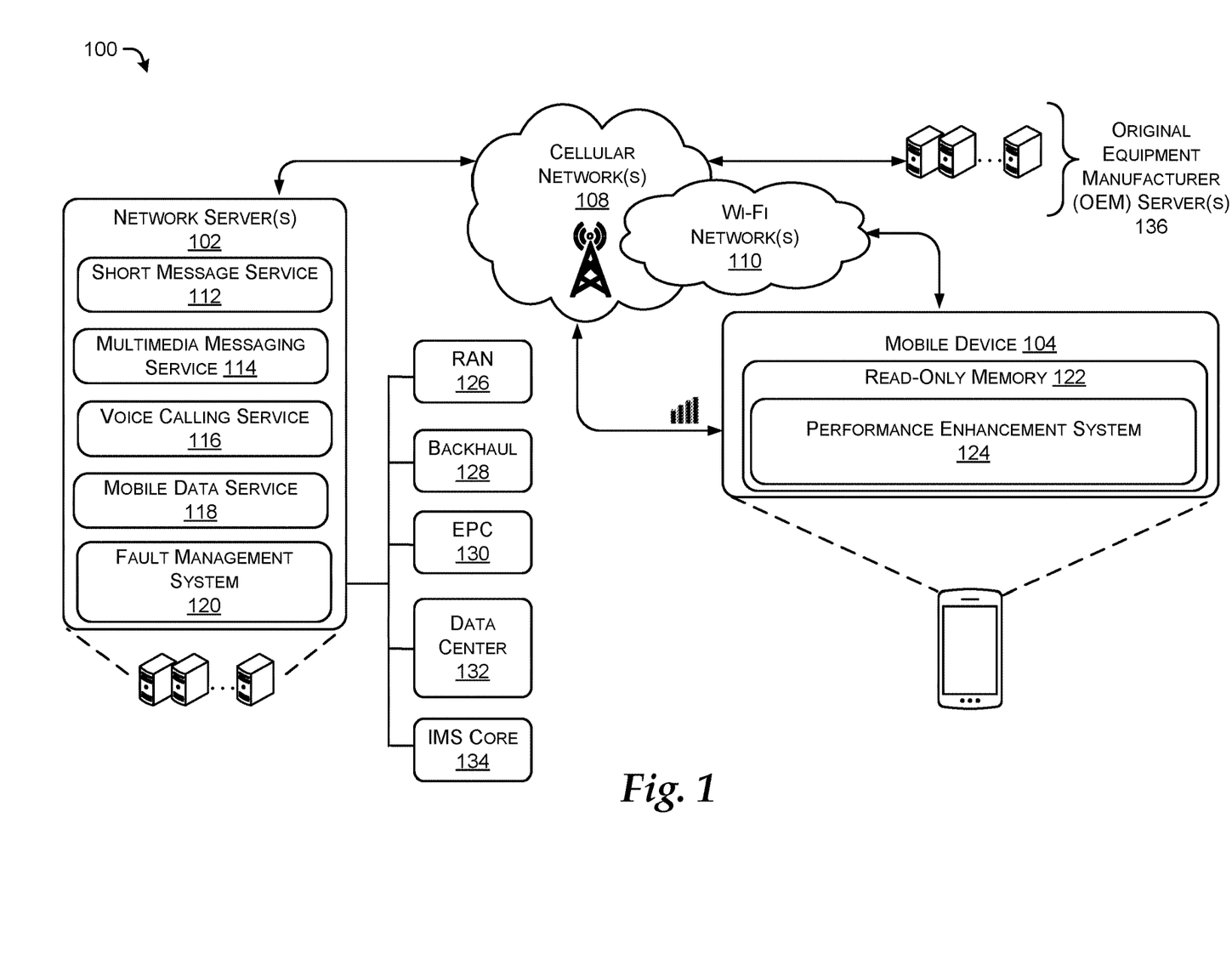
FIG. 1 illustrates an example cellular communications network for mobile device network performance restoration, according to an embodiment.

FIG. 1 illustrates an example cellular communications network infrastructure 100 (hereafter "infrastructure 100") such as may be implemented by a cellular services provider. The infrastructure 100 may be configured for restoring and/or improving performance of an example electronic device (hereafter "mobile device 104") for use on one or more cellular network(s) (hereafter "cellular network(s) 108"), according to an embodiment. In some aspects, the mobile device 104 may communicate with one or more other electronic devices and/or systems via the cellular network(s) 108, and one or more Wi-Fi network(s) 110.

One or more network server(s) 102 may provide operational equipment and infrastructure management in support of the cellular network(s) 108. The network server(s) 102 may provide back-end delivery and support of cellular network services including, for example, a short message service (SMS) 112, a multimedia messaging service (MMS) 114, a voice calling service 116, and a mobile data service 118. The network server(s) 102 may also include a fault management system 120 for evaluating network communications functionality, and performing various remediation steps to improve and/or remedy any hardware performance deficiencies.

The network server(s) 102 may include and/or communicate with various types of operational equipment that support the cellular communications network, such as servers, routers, firewalls, hubs, switches, and so forth. Many of the operational equipment elements communicate over a non-cellular IP (Internet Protocol) network for purposes of control and reporting. Most relevant to this discussion, multiple components of the infrastructure 100 may communicate status information to network management hosts such as the fault management system 120, and to a performance enhancement system 124 operating on the mobile device 104. Status information can include faults, performance metrics, conditions, and so forth. Status information can be communicated using protocols such as SNMP (Simple Network Management Protocol), EMS (Element Management System), and MMS (Manufacturing Message Specification). For purposes of illustration, these parts and components are represented as network elements including, for example, a RAN (Radio Access Network) 126, a Backhaul 128, an EPC (Evolved Packet Core) 130, a data center 132, and an IMS (IP Multimedia Subsystem) Core 134. The infrastructure 100 may include multiple instances of any of the illustrated network elements 126-134 and/or other elements that are not shown. The infrastructure 100 may be distributed over a very large region, such as over an entire country or a portion of a country. The infrastructure 100 may implement a GSM (global system for mobile communications) network, as one example.

The mobile device 104 may be configured to communicate on the cellular network(s) 108 using the network services 112-118, depicted with respect to the network server(s) 102. Accordingly, the mobile device 104 may also include hardware and software supporting communications services such as a SMS, a MMS, a voice calling service, and a mobile data service, among other wireless access technologies. For example, wireless access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of wireless access technology.

When mobile devices and other network-connected hardware experience dynamically-changing environmental conditions such as, for example, atmospheric changes, geographic changes, hardware functionality fluctuations, and other conditions that change with time, it may be necessary to modify device settings that control the hardware functionality of the mobile device to compensate for any losses of network communications performance. Conventional self-help applications on a mobile device may provide some diagnostic testing to determine network functionality issues, and may provide some self-remedy steps for the user. However, conventional applications do not have access to some device settings, and thus, may not perform some self-correction steps to improve and/or restore functionality. For example, conventional applications may not have access to hardware controls the Wi-Fi calling preference on the mobile device, change access point name (APN) address settings, enable or disable mobile data settings and/or tethering settings, terminate an instantiation of an application running on the device, and/or clear cache memory on the mobile device 104. Embodiments of the present disclosure can address these limitations of mobile device diagnostic applications by executing a performance enhancement system from the ROM of a mobile device.

In one embodiment, the mobile device 104 may include a performance enhancement system 124 (hereafter "system 124") stored on a ROM 122 of the mobile device 104. The system 124 may include one or more instruction sets for causing the mobile device 104 to execute one or more performance evaluations associated with one or more services on the mobile device 104. The performance evaluations may identify hardware performance deficiencies associated with hardware settings and/or network settings associated with the services operating on the mobile device 104. The performance evaluations may also identify network settings that that may be improved for the network services 112-118 operating on the network server(s) 102.

In some aspects, the mobile device 104 may perform tests by sending commands and receiving data through interfaces of the mobile device 104 (discussed in greater detail with respect to FIG. 6), issue requests for tests and configuration changes to an OEM server associated with the mobile device 104, such as, for example, one or more OEM server(s) 136. The performance enhancement system 124 may also issue and accept commands that control configuration and operation of the mobile device 104 and network server(s) 102. Commands issued by the system 124 can also simulate user input. Commands issued by the system 124 can similarly request data indicating responses and output of other applications that execute on the test devices, including output and status of user interfaces. Commands issued by the system 124 can also request information regarding states, conditions, and configurations of the network services operating on the mobile device 104, the network services 112-118 operating on the network server(s) 102, and/or other settings that interface with and control the mobile device 104.

Device hardware access that is command-controllable (e.g., via an application executed on the mobile device 104) requires root access on most typical Android-based operations systems (e.g., Linux systems). According to one or more embodiments, the ROM 122, and more particularly, a bootloader portion of the operating system boot files stored on the ROM 122, may be configured to run the performance enhancement system 124 in a root mode or administrator mode such that the system 124 has direct access to controlled settings associated with power cycling the mobile device, unlocking IMEI, clearing device memory (e.g., working memory in the mobile device 104), terminating applications running on the mobile device 104, turning mobile data on or off, modifying APN settings, modifying MNC/MCC settings, modifying the MMCS settings, enabling and/or disabling Wi-Fi, enabling and disabling cellular preferred settings, among other operations. When an application is run in a conventional way, that is, from device random-access memory (RAM), the above-mentioned operational characteristics may not be altered via device setting changes administrated either locally via an application, or remotely via a control mechanism administered via the network server(s) 102.

Although various elements of FIG. 1 are shown and described as being discrete devices or components for purposes of discussion, any of the illustrated computing elements may, in practice, include one or more physical, virtual, or otherwise abstracted cluster or network of machines and/or devices. For example, although the network server(s) may be depicted as a single entity, the term "network server(s)" is intended to reference any one or more computing devices, including physical devices and virtual computing units, and including network-based devices that are commonly referred to as being in the cloud. Moreover, although a single mobile device is depicted, it should be appreciated that the infrastructure 100 may include any number and types of mobile devices, and of such devices, the mobile device 104 is merely a singular non-limiting example.

Figure 2:
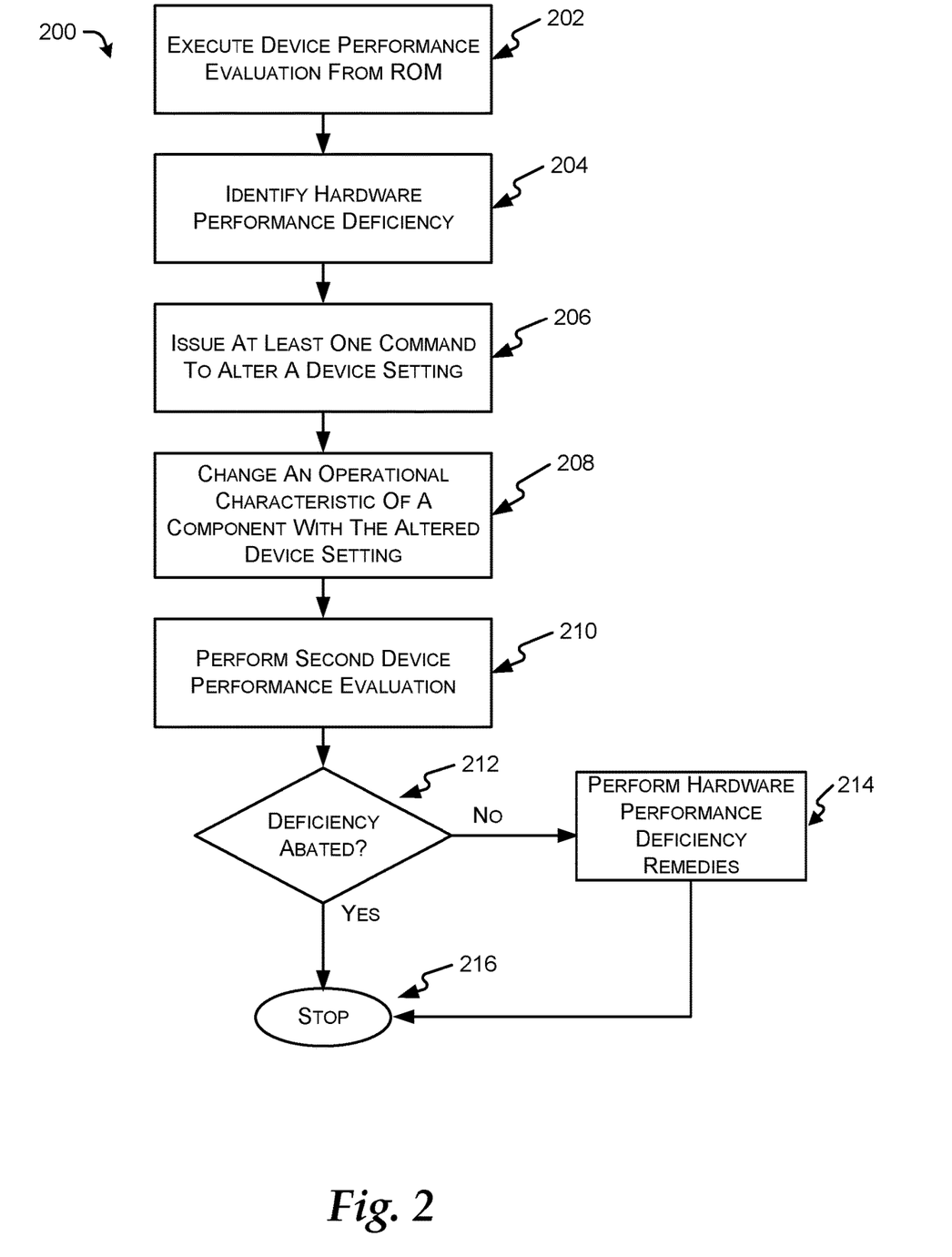
FIG. 2 illustrates an example flow diagram for mobile device network performance restoration, according to an embodiment.

FIG. 2 illustrates an example flow diagram of a method 200 for network performance restoration, according to an embodiment. At step 202, the mobile device 104 may execute a device performance evaluation from the ROM 122 of the mobile device 104. Executing a device performance evaluation may include loading one or more instructions from the ROM 122, and executing the one or more instructions by a processor of the mobile device 104 (e.g., one or more processor(s) 610 as shown with respect to FIG. 6). In some embodiments, it may be possible to execute the device performance evaluation from one or more other locations, while in a root mode providing access to the functionalities described above. For example, although described as being a ROM-stored instruction set, in some embodiments, the device performance evaluation may be executed from another type of memory configured to provide full device access for instruction execution.

Execution of a performance evaluation may be triggered in various ways. For example, in one aspect, the system 124 may include a device performance evaluation module that is instantiated by the mobile device processor at the time the mobile device 104 is turned on, where the performance enhancement system 124 continually runs as a background application in the mobile device 104. The performance evaluation, described in greater detail hereafter, can include execution of one or more device checks (performed by the mobile device 104) in a first phase of the performance evaluation, and one or more network checks (performed by a network server such as the network server(s) 102) in a second phase of the performance evaluation. The performance evaluation phases may be triggered by an indication a performance deficiency associated with hardware and/or network operation of the mobile device 104.

In another example, the performance enhancement system 124 may include a user interface such as an icon or other program launch link (not shown) that may be selectable by a user. In this example, if a user notices any diminished network performance issues, such as, e.g., dropped calls, message transmission failures, data connectivity issues, data throughput issues, etc., the user may activate the performance enhancement system 124 using a user-initiated command to launch the application. Accordingly, the processor may execute a device performance evaluation from the ROM 122 responsive to a user selection of an icon or other user interface.

In yet another example, the network server(s) 102 may continuously monitor the network services 112-118 associated with the mobile device 104, and evaluate any diminished performance associated with the mobile device's operation on the cellular network(s) 108. For example, the fault management system 120 may be configured to monitor aspects of connectivity of the mobile device 104, such as a rate of call completion vs. calls dropped within a predetermined period of time, a rate of SMS failures within the predetermined period of time, call quality metrics associated with the voice calling service 116, MMS failures within the predetermined period of time, etc. A predetermined period of time may be, for example, one minute, three minutes, one hour, one day, one week, etc. Accordingly, the processor(s) 610 of the mobile device 104 may execute a device performance evaluation from the ROM 122 responsive to an observed performance deficiency associated with one or more services operating on the mobile device 104.

At step 204, the mobile device 104, and more particularly, the performance enhancement system 124, may cause the processor of the mobile device 104 to identify a hardware performance deficiency. The hardware performance deficiency may be associated with a device setting, a network setting associated with the network server(s) 102, or another control mechanism in the infrastructure 100. In other aspects, the hardware performance deficiency may be caused by malfunctioning or failing hardware components within the mobile device 104. In one embodiment, identifying the hardware performance deficiency can include performing one or more device checks via the mobile device 104, and performing one or more network checks via the network server(s) 102.

Device-based checking can include evaluation of the functionality of the mobile device 104 for issues associated with signal strength of the device's connection with one or more of the cellular network(s) 108 and/or the Wi-Fi network(s) 110. For example, a device check can evaluate whether the signal strength is deficient by executing an API via the processor, where the API transmits a request to the OEM server(s) 136 to perform a signal strength comparison of a current signal strength with a nominal (expected) signal strength. Accordingly, the OEM server(s) 136 may, responsive to the request from the mobile device 104, retrieve chipset data from the mobile device 104 indicative of particular hardware on the mobile device 104. In another aspect, the API may directly call chipset information from the mobile device 104, and transmit the chipset information to the OEM server(s) 136. The OEM may return signal strength comparison information to the mobile device 104 via the cellular network(s) 108 and/or the Wi-Fi network(s) 110, where the signal strength comparison information is indicative of a comparison of a nominal signal strength expected with specific chipsets, compared with a measured signal strength at the time of the transmitted request. The comparison may indicate a signal strength deficiency, or may indicate an expected signal strength observed given the chipset of the mobile device 104.

Figure 6:
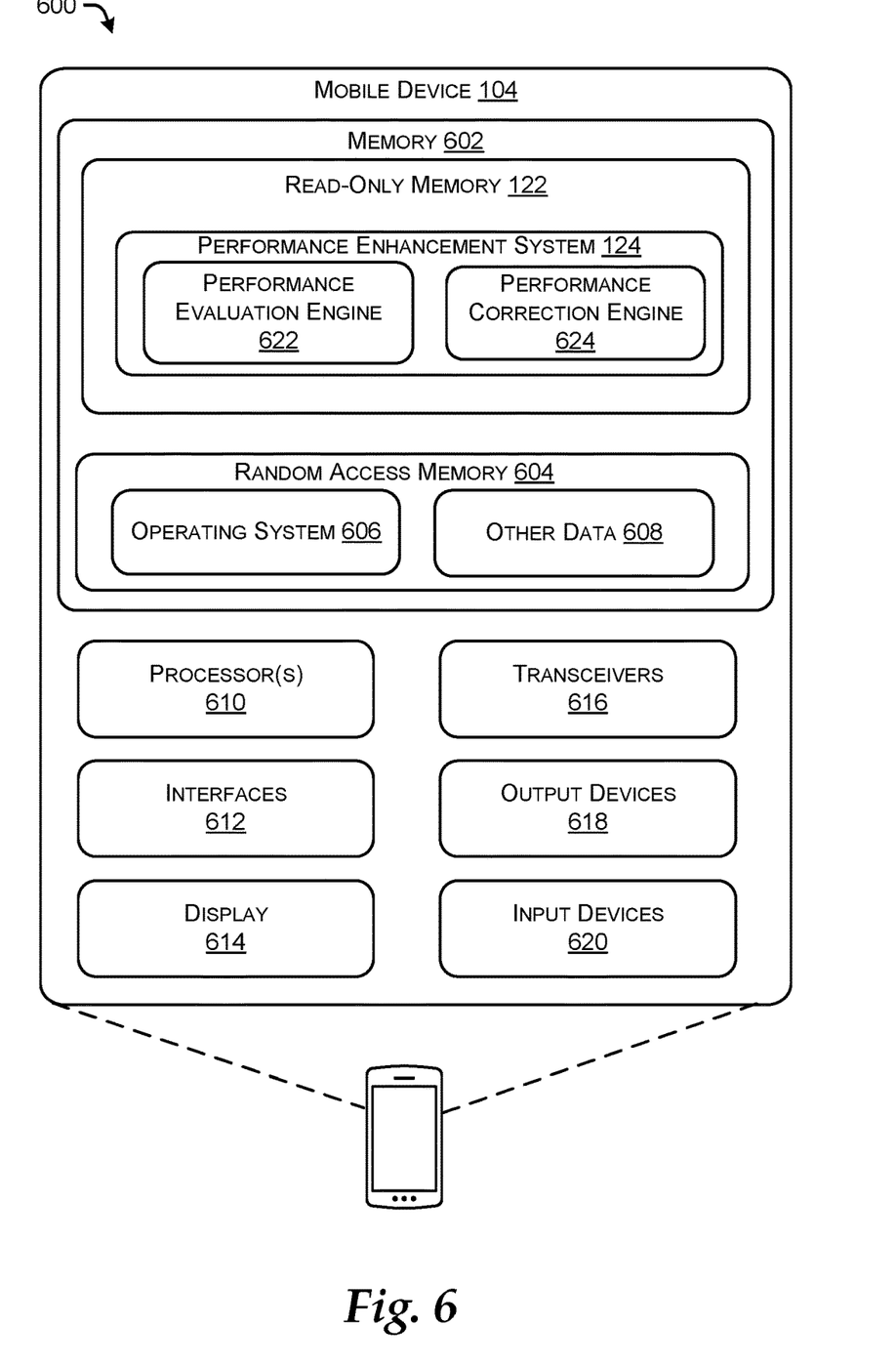
FIG. 6 illustrates a block diagram of a mobile device, according to an embodiment.

In another aspect, device-based checking can include evaluation of the functionality of the mobile device 104 for issues associated with failed MMS message transmission. In an example embodiment, the performance enhancement system 124 may determine whether the MMS messages are transmitted and received within expected operational efficiencies. The system 124 may identify hardware performance deficiencies by identifying a count of failed MMS messages observed by the system 124 within a predetermined span of time. In some operating systems, MMS failure data may be stored on local memory of the mobile device 104. The system 124 may query the device memory (e.g., the RAM 604, as shown in FIG. 6) to query one or more records associated with MMS data failures. In one aspect, the system 124 may query the memory 602 systematically at predetermined intervals of time (e.g., every hour, every day, every 5 days, etc.). In another aspect, the system 124 may query the memory 602 when triggered by a predetermined event, such as, for example, a failed MMS message transmission. The system 124 may determine, based on data stored in the memory 602, that the MMS instantiated on the mobile device 104, and/or the MMS 114 instantiated on the network server(s) 102 may be operating in a sub-optimal manner. In yet another aspect, the system 124 may query the MMS 114 at the network server(s) 102, and evaluate a responsive message transmitted from the MMS 114.

In another aspect, identifying hardware performance deficiencies may include network-based checking steps. For example, identifying performance-related issues can include evaluation of the data connectivity between the mobile device 104 and the cellular network(s) 108, where the evaluation is completed in whole or in party by the network server(s) 102. In some aspects, the mobile device 104 may transmit and receive Internet data through the cellular network(s) 108, either directly or via the Wi-Fi network(s) 110. Data connectivity deficiencies may include a diminished data transfer speed, non-connectivity of the mobile device 104 with the mobile data service 118, and/or intermittent connectivity with the mobile data service 118.

In one embodiment, identifying hardware performance deficiencies can include determining whether data transmissions to and from the mobile device 104 are functional at a level expected for the device (e.g., mobile device 104), a data plan (service agreement) associated with that device, a user of that device, and the cellular network(s), and other factors indicative of an expected data transmission rate. For example, the mobile device 104 may query the network server(s) 102 to determine information indicative of account information, user identity, throttled data speed associated with account usage, the overall activity of an account, and other account use observations such as, for example, evaluation of the data sock provisioning used by the mobile data service 118. The performance enhancement system 124 may identify hardware performance deficiencies by evaluating packet loss and data throughput associated with a data connection to the cellular network(s) 108, and comparing the observed packet loss to a value associated with an expected packet loss. Other methods for determining performance deficiencies are contemplated.

In another embodiment, identifying hardware performance deficiencies can include determining, via the performance enhancement system 124, whether the mobile device 104 has experienced a lack of data connectivity due to an invalid APN setting on the mobile device 104. Accordingly, the mobile device 104 may determine whether a connection error is caused by the APN setting by evaluating whether a particular address associated with the APN is functional.

In another embodiment, identifying hardware performance deficiencies can include determining whether applications are malfunctioning and/or quitting unexpectedly. Premature or unexpected cessation of a program (e.g., a crash) occurs when a software application or an operating system stops functioning properly and exits. If the program is a critical part of the operating system, the entire system may crash or hang, often resulting in a kernel panic or fatal system error.

In some aspects, the software failure may be due to invalid attempts at reading or writing memory locations that are not allocated for that purpose (e.g., a segmentation fault). In other aspects, the processor may attempt to execute privileged or invalid instructions, or attempt to perform I/O operations on hardware components to which permission is not granted. Malicious program code or other activities may also cause system crashes in these ways, or other ways. The system 124 may identify the performance deficiency by evaluating one or more crash log files indicative of a cause for the software failure(s). A crash log may be stored in the RAM 604 as depicted in FIG. 6, for example, as other data 608. In one embodiment, the crash log may include information that can indicate that a program or application operative on the mobile device 104 is a cause of a performance deficiency.

In another aspect, identifying hardware performance deficiencies may include network-performed checks associated with network outages. For example, the system 124 may determine that there is diminished connectivity, intermittent connectivity, or no connectivity to the cellular network(s) 108 at all. In the case of at least some connectivity, the system 124 may transmit a request to the network server(s) 102 to evaluate tower performance, and return data indicative of any possible tower outage(s). Responsive to the request from the mobile device, the network server(s) 102, and more particularly, the fault management system 120, may evaluate tower performance associated with towers in the geographic vicinity of the mobile device 104.

To evaluate the tower performance, the fault management system 120 may determine whether roaming is enabled on the mobile device 104 by querying the performance enhancement system 124, and query other user devices connected with the cellular network(s) 108 that may be operating within a predetermined geographic distance from the mobile device 104. The query to the other devices may include data indicative of signal strength, data connectivity, data throughput, voice calling performance, MMS performance, SMS performance, etc. The fault management system 120 may compare return data from the device queries with corresponding metrics associated with the mobile device 104, and identify outage or congestion information based on the compared metrics. An API in the fault management system 120 may return any outage or congestion information to the performance enhancement system 124 on the mobile device 104.

As explained in the prior examples, the system 124 may identify hardware performance deficiencies in various ways that may be categorized into two generalized steps: performing device-based hardware checks and performing network-based hardware checks. It should be appreciated that hardware checks often can include software performance checking.

Embodiments of the present disclosure may provide computer functional improvements by improving the connectivity, speed, and overall functionality of the mobile device 104 on the cellular network(s) 108. The performance enhancement system 124 can make these improvements, at least in part, by altering device settings and network settings based on any identified hardware performance deficiencies identified in the previous step.

At step 206, responsive to identifying at least one hardware performance deficiency, the system 124 may issue at least one command to alter a device setting on the mobile device 104. In one aspect, the mobile device processor(s) 610 may issue a command to the network server(s) 102 to alter the at least one network setting by stopping and restating one or more of the voice calling service 116 and the mobile data service 118 at the network server(s) 102. Accordingly, the network server(s) 102 may be instructed by the mobile device 104 to perform certain steps including starting, stopping, resetting, and/or altering a configuration of one or more services.

In another aspect, at step 206 the system 124 causes the processor(s) 610 to issue a command to the network server(s) 102 access a roaming setting on the mobile device 104 from the network server. At step 208, the processor(s) 610 may change an operational characteristic of a component with the altered device setting. In some aspects, processor(s) 610 may alter the device setting on the mobile device 104 directly, without transmitting a command to the network server(s) 102. In other aspects, the mobile device 104 may instruct the network server(s) 102 to alter the device setting on the mobile device 104. If the hardware performance issue is a connection deficiency (e.g., the mobile device 104 does not connect with the cellular network(s) 108, or does not connect consistently), changing the operational characteristic may include, for example, performing a master reset operation on the mobile device 104, enabling or disabling communications settings on the mobile device 104 such as Wi-Fi calling, airplane mode, mobile data, and data roaming, modifying cellular network preferred settings on the mobile device 104, or another setting.

In one embodiment, the system 124 may unblock IMEI on the mobile device 104 to correct a connectivity issue between the mobile device 104 and the cellular network(s) 108. The IMEI is a serial number that can identify a mobile device uniquely. Unblocking an IMEI may include authenticating a user using one or more authentication techniques, and transmitting a message to the network server(s) 102 to unblock the IMEI associated with the mobile device 104. The message transmission may include an authentication confirmation. Responsive to the received message and authentication confirmation, the network server(s) 102 may unblock the IMEI.

In another aspect, the system 124 may change the operational characteristic by performing a master reset operation on the mobile device 104. The master reset operation may be triggered by the processor(s) 610, and performed directly by performing a series of reset tasks saved on the ROM 122 as a reset algorithm. In another aspect, the system 124 may perform a master reset by transmitting a request to the network server(s) 102, and receiving a data transmission configured to restore all data and applications on the mobile device 104 after the master reset operation. In another aspect, the master reset operation may include a power off and power on operation on the mobile device 104, where the power off and on commands are issued by the processor(s) 610.

According to another embodiment, the system 124 may change the operational characteristic by enabling or disabling communications settings on the mobile device 104 by instructing the processor(s) 610 to issue a command to a transceiver of the mobile device 104 (e.g., the transceivers 616 as shown with respect to FIG. 6). The command may enable a cellular preferred setting on the mobile device 104 that configures the mobile device 104 for a Wi-Fi connection via the transceivers 616, and/or disable, then enable the cellular preferred setting.

In another aspect, the system 124 may cause the processor(s) 610 to restart an APN service of the mobile device 104. Accordingly, responsive to the system 124 determining at step 204 that the hardware performance deficiency is due to an invalid APN address associated with the mobile device 104, the system 124 may transmit a request to the network server(s) 102 for a new APN address associated with the mobile device 104 via the transceivers 616. Responsive to receiving a valid APN from the network server(s) 102, the system 124 may instruct the processor(s) 610 to modify a memory location (e.g., a memory location in RAM 604 such as other data 608) associated with the current APN address setting by saving the new APN address to the memory location. After saving the valid (and/or new) APN address, the system 124 may restart the APN service on the mobile device 104.

In another aspect, at step 204 the system 124 may determine that the performance deficiency includes at least one erroneous MMS message on the mobile device 104 associated with a call system of one or more services on the mobile device 104. Accordingly, at step 206, the processor(s) 610 may identify the hardware performance deficiency by transmitting a request to the MMS 114 on the network server(s) 102 for an MMS address. The MMS 114 may transmit the address to the mobile device 104 via the transceivers 616 responsive to the request.

At step 208, the system 124 may change an operational characteristic of a component with the altered device setting by modifying a memory location associated with the MMS setting on the mobile device 104. By saving the new MMS address to a memory location, the system may restart the MMS on the mobile device 104, and reconnect with the MMS address saved to the memory.

At step 210, the system 124 may perform a second device performance evaluation, and determine whether the deficiency is abated (step 212). Responsive to determining that the deficiency is abated (that is, the hardware and/or software malfunction is no longer detected by the system 124, and/or the performance of all mobile device 104 systems has been restored to an expected condition), the process may stop at step 216.

Responsive to determining at step 212 that the deficiency is not abated, the system 124 may perform one or more hardware performance remediation steps, as shown at step 214. The remedies can include, for example, issuing, via the processor(s) 610, a command to the network server(s) 102 to alter at least one network setting as described above with respect to step 206. As part of the remedies described with respect to step 214, the processor(s) 610 may perform a third device performance evaluation associated with the one or more services on the mobile device 104, and determine, based at least in part on the third device performance evaluation, whether the hardware performance deficiency is abated.

In some aspects, self-remedy steps performed by the system 124 may not be sufficient to restore full functionality to the mobile device 104. In some limited embodiments, the processor(s) 610 may generate a message to the network server(s) 102 indicative of a connectivity failure when the hardware performance deficiency is not abated. In some aspects, the message may include a help ticket indicative of the mobile device 104, an identification of a user of the device, circumstances associated with the performance deficiency (e.g., date, time, steps performed by the system 124, information indicative of the source of the performance issues, etc.). The help ticket may be useful for a network administrator to resolve the performance issues.

Figure 3:
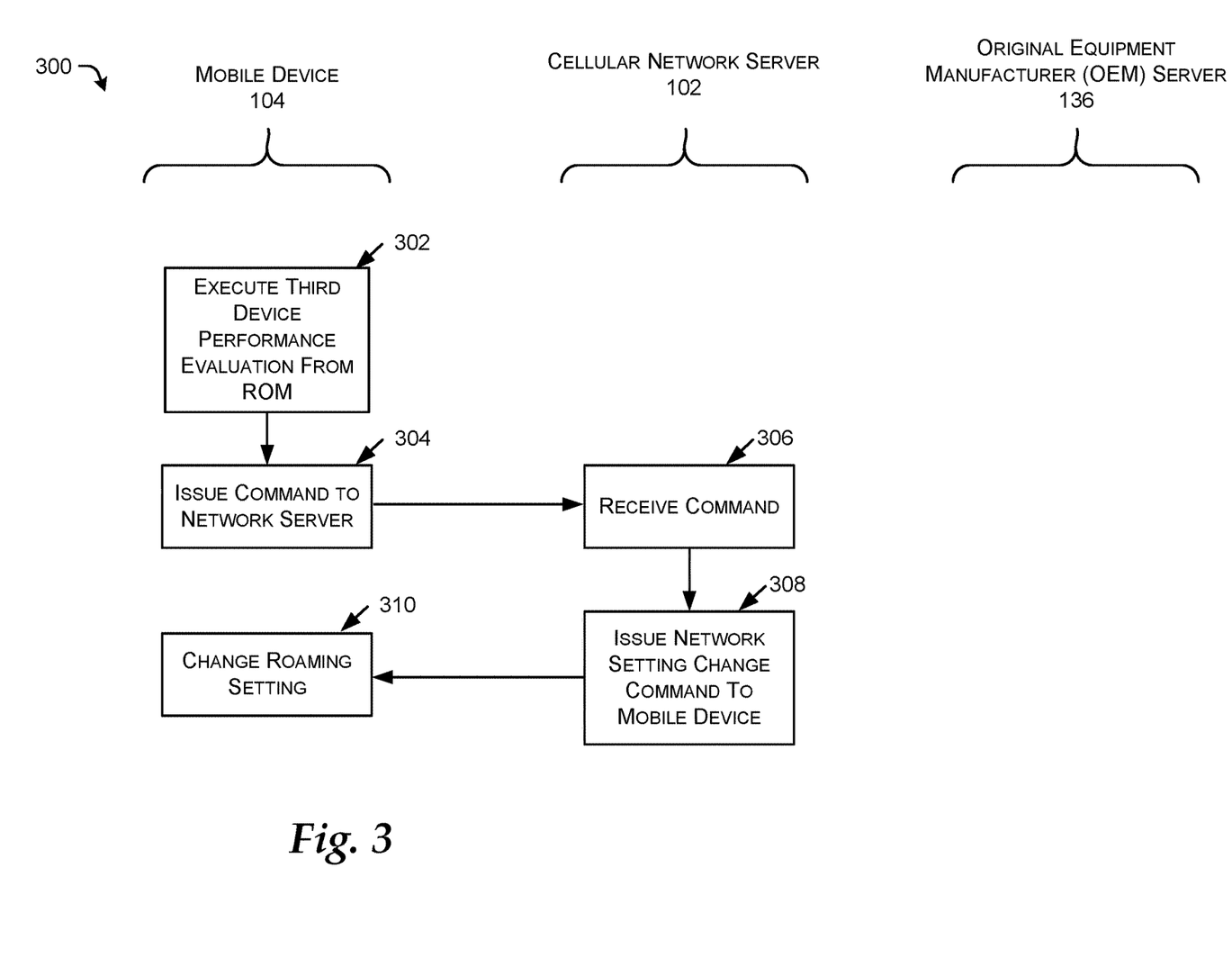
FIG. 3 illustrates an example flow diagram for changing a network setting using a command issued by a mobile device application, according to an embodiment.

FIG. 3 illustrates another example flow diagram 300 for changing a network setting using a command issued by the mobile device 104, according to an embodiment. FIG. 3 will be discussed with reference to FIG. 2. Referring once again to FIG. 2, at step 212, the system 124 may determine whether the deficiency was abated by the prior remediation steps. Responsive to determining at step 212 that the deficiency is not abated, the system 124 may perform one or more hardware performance remediation steps, as shown at step 214.

In the example depicted in FIG. 3, a connectivity issue may be caused by a weak signal to and/or from an in-network cellular tower. Accordingly, at step 302, the system 124 may execute a third device performance evaluation from the ROM 122. In one example scenario, the system 124 may determine that a non-network tower may improve the connectivity of the mobile device 104, and perform a change to a roaming setting in the mobile device 104. At step 304, the processor(s) 610 may issue a command to the network server(s) 102 to alter at least one network setting, such as a roaming setting that determines whether the mobile device 104 is permitted to connect with a non-network tower. Any of the device setting changes discussed herein are contemplated, and should not be limited to roaming. At step 304, the mobile device 104 may issue a roaming-enable command to the network server(s) 102, that the network server(s) 102 enable the mobile device 104 for roaming, which may improve the signal strength due to the device's proximity to network and non-network towers. The network server(s) 102 may receive the command at step 306, and at step 308, issue a network setting change command to the mobile device in response to the command received at step 306.

Step 310 depicts the mobile device 104 receiving the setting change command from the network server(s) 102, and changing the roaming setting.

Figure 4:
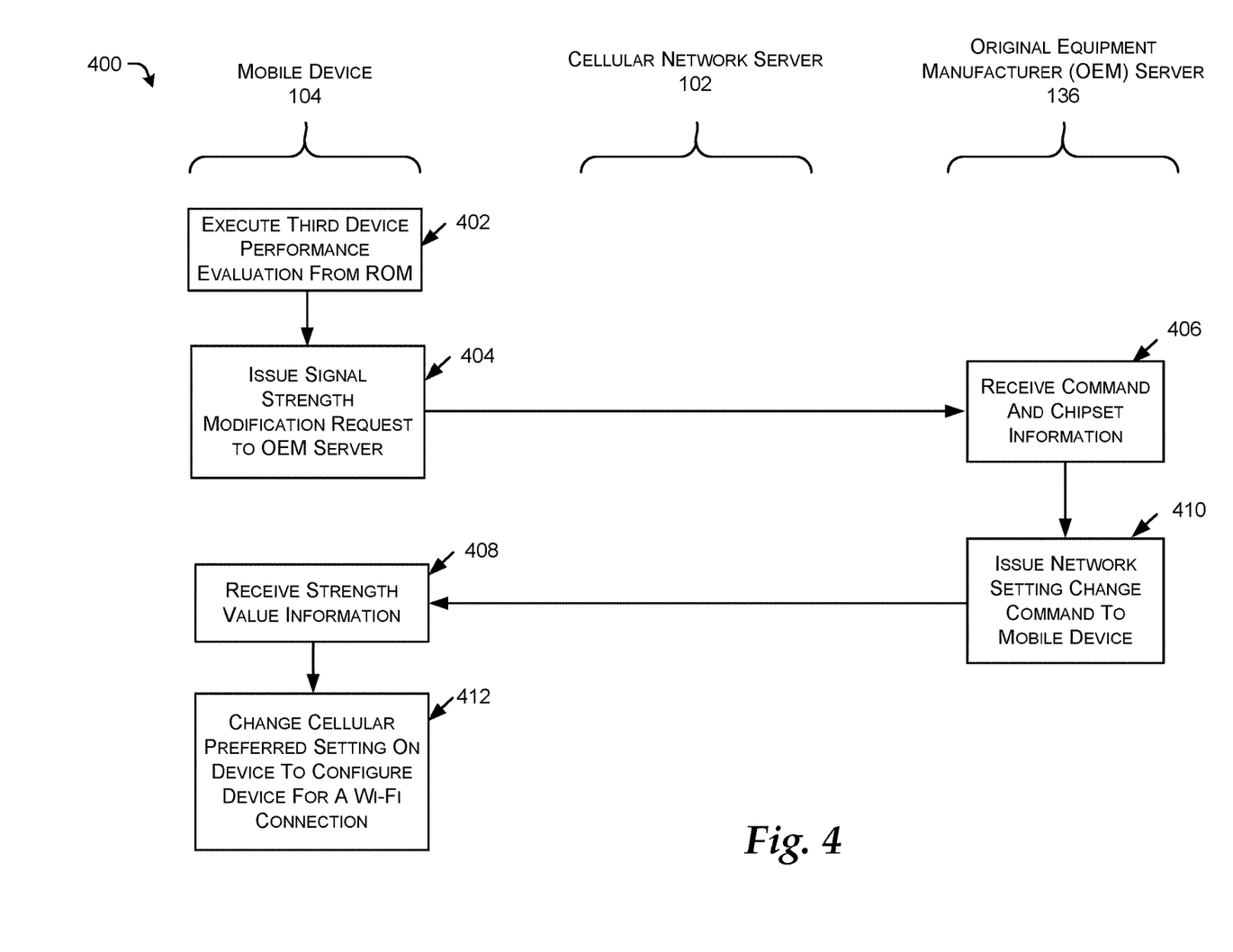
FIG. 4 illustrates another example flow diagram for modifying a setting on a mobile device, according to an embodiment.

FIG. 4 illustrates another example flow diagram 400 for modifying a setting on a mobile device, according to an embodiment. The flow example of FIG. 4 demonstrates how, in one embodiment, the mobile device 104 may change a setting through the OEM server(s) 136. The system 124 may require assistance from the OEM server(s) 136 to make some device setting changes, such as signal strength modifications. After commanding last setting change, at step 402, the system 124 may execute the third device performance evaluation. In the example flow diagram 400, the system 124 may determine, after the third device performance evaluation, that a signal strength modification through the mobile device 104 may improve or completely abate the deficiency. The system 124 may issue a signal strength modification request to the OEM server(s) 136 at step 404. At step 406, the OEM server(s) 136 may receive the command, which may include chipset information indicative of the make and model of the mobile device 104, and at step 410, responsive to the command for signal strength modification issued by the system 124 of the mobile device 104, the OEM server(s) 136 may issue a network setting change command to the mobile device 104. The network setting change command may direct the processor(s) 610 to modify one or more aspects of the transceivers 616, or another device setting, such that the signal strength sent from the mobile device 104 is increased from a first (nominal) setting to an increased setting with respect to the first setting.

At step 408, the system 124 may receive the strength value information from the OEM server(s) 136, and make the change to one or more device settings in the mobile device 104 based on the signal strength value information. In one example, the system 124 may change the signal strength to increase the energy output. In another example, as shown in step 412, the system 124 may change the cellular preferred setting on the device to configure the device for a Wi-Fi connection. Other steps and settings are contemplated, and thus, should not be limited to the examples used with respect to FIG. 4.

Figure 5:
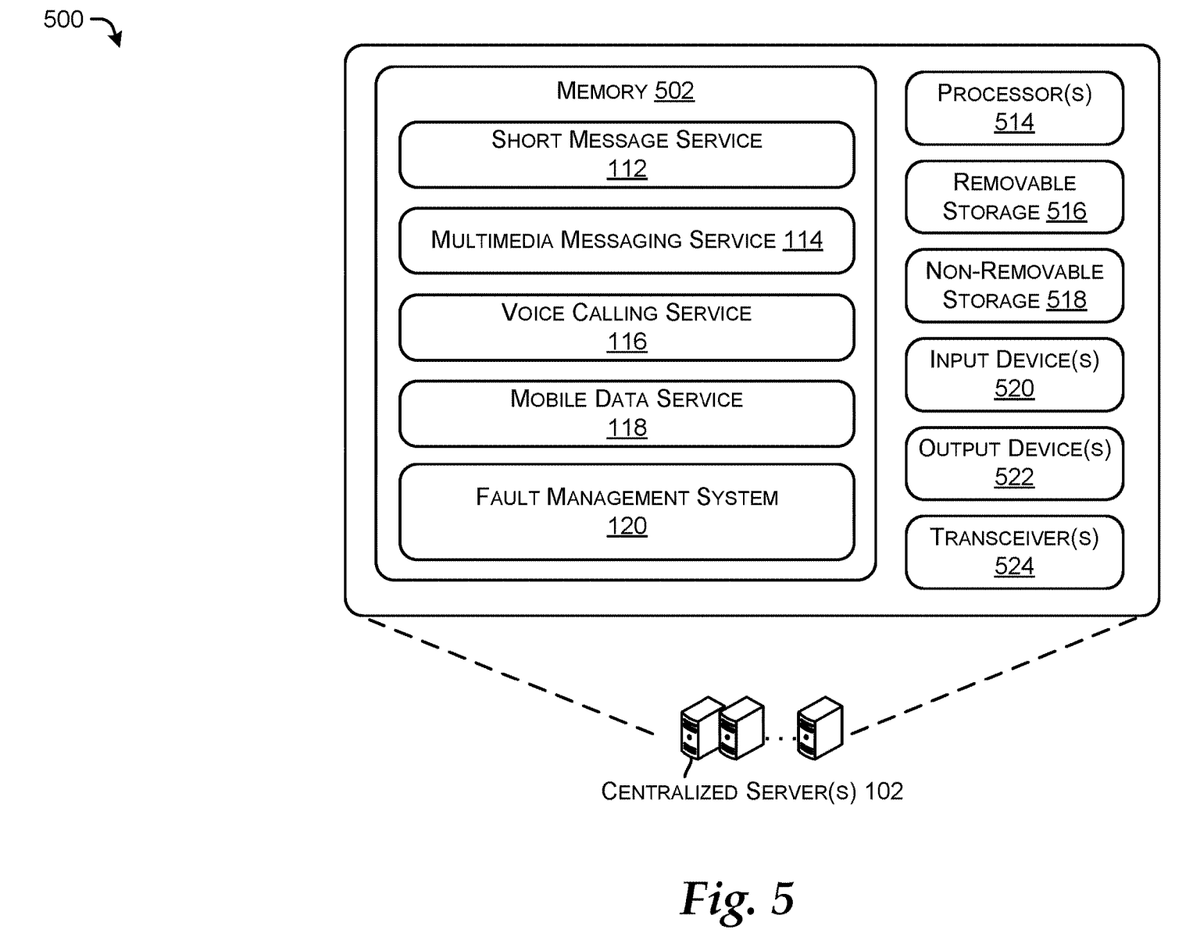
FIG. 5 illustrates a block diagram of a centralized server, according to an embodiment.

FIG. 5 illustrates an example 500 of the example network server(s) 102 configured to diagnose and improve mobile device connectivity in a network such as, for example, the mobile device 104 operating with the cellular network(s) 108. The network server(s) 102 may be used to implement the various operations described herein. It is to be understood in the context of this disclosure that the network server(s) 102 may be implemented as a single device or as a plurality of devices with modules and data distributed among them. The network server(s) 102 may include memory 502 storing the fault management system 120, the SMS 112, the MMS 114, the voice calling service 116, and the mobile data service 118, as described herein. Also, the network server(s) 102 includes one or more processor(s) 514, a removable storage 516, a non-removable storage 518, input device(s) 520, output device(s) 522, and transceiver(s) 524.

In various embodiments, the memory 502 may be volatile (such as RAM), non-volatile (such as ROM, flash memory, etc.) or some combination of the two. The fault management system 120, the SMS 112, the MMS 114, the voice calling service 116, and the mobile data service 118, can comprise methods, threads, processes, applications or any other sort of executable instructions. The fault management system 120, the SMS 112, the MMS 114, the voice calling service 116, and the mobile data service 118, can also include files and databases (not shown) storing values associated with expected or nominal settings, values, etc., for the various services described. Details of the fault management system 120, the SMS 112, the MMS 114, the voice calling service 116, and the mobile data service 118, are provided above in the discussion of FIG. 1.

In some embodiments, the one or more processor(s) 514 are central processing units (CPUs), graphics processing units (GPUs), or both CPU and GPU, or other processing units or components known in the art.

The network server(s) 102 may also include additional data storage devices (removable and/or non-removable) such as, for example, magnetic disks, optical disks, or tape. Such additional storage is illustrated in FIG. 5 by removable storage 516 and non-removable storage 518. Tangible computer-readable media can include volatile and non-volatile, removable and non-removable media implemented in any method or technology for storage of information, such as computer readable instructions, data structures, program modules, or other data. Memory 502, removable storage 516 and non-removable storage 518 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the network server(s) 102. Any such tangible computer-readable media can be part of the network server(s) 102.

The network server(s) 102 also can include input device(s) 520, such as a keypad, a cursor control, a touch-sensitive display, voice input device, etc., and output device(s) 522 such as a display, speakers, printers, haptic feedback, etc. These devices are well known in the art and need not be discussed at length here.

As illustrated in FIG. 5, the network server(s) 102 also include one or more wired or wireless transceiver(s) 524. The transceiver(s) 524 can include a network interface card (NIC), a network adapter, a LAN adapter, or a physical, virtual, or logical address to connect to the cellular network(s) 108 and the Wi-Fi network(s) 110, OEM server(s) 136, and the mobile device 104. To increase throughput when exchanging wireless data, the transceiver(s) 524 can utilize multiple-input/multiple-output (MIMO) technology. The transceiver(s) 524 can embody any sort of wireless transceiver device capable of engaging in wireless, radio frequency (RF) communication. The transceiver(s) 524 can also include other wireless modems, such as a modem for engaging in Wi-Fi, WiMAX, Bluetooth, or infrared communication.

FIG. 6 illustrates a component level view of the mobile device 104 configured for diagnosing and improving mobile device connectivity with the cellular network(s) 108 and/or 110. As illustrated in FIG. 6, the mobile device 104 may include a system memory 602 that includes the ROM 122 and a RAM 604. The ROM 122 may store the performance enhancement system 124, which may include one or more applications. For example, the ROM 122 can include a performance evaluation engine 622 and a performance correction engine 624.

The performance evaluation engine 622 may be configured for performing the device performance evaluation steps associated with one or more services on the mobile device 104. The one or more services can include, for example, a short message service (SMS), a multimedia messaging service (MMS), a voice calling service, and a mobile data service, which may communicate with and or otherwise share information with corresponding services on the network server(s) 102 including the SMS 112, the MMS 114, the voice calling service 116, the mobile data service 118, and/or the fault management system 120. The performance evaluation engine 622 may be configured for identifying a hardware performance deficiency associated with hardware components in the infrastructure 100 described with respect to FIG. 1, and more specifically, with hardware components associated with the mobile device 104.

In some embodiments, the performance evaluation engine 622 may perform system test procedures specified by one or more test scripts designed to evaluate hardware and/or software functionality. For example, the performance evaluation engine 622 may output one or more test results that can include various types of data, indicating information such as cellular network speeds, signal strengths, response latencies, application load times, application response times, availability through the cellular network of various servers or services, responsiveness of servers or services, and/or any other information as specified by the test script(s). As another example, the performance evaluation engine 622 may include and/or utilize scripts for determining whether the cellular network(s) are impaired in some way, or that some geographic portion of the cellular network(s) is functionally impaired. The performance evaluation engine 622 may determine, based at least in part on one or more device performance evaluations, whether a hardware performance deficiency is abated after another software component (e.g., the performance correction engine 624) had completed one or more remediation steps, as described in example embodiments.

According to another embodiment, the performance evaluation engine 622 may be configured to identify a hardware performance deficiency by executing an API that causes the transceivers 616 to transmit one or more signal strength modification requests to the OEM server(s) 136, and/or receive requests for signal information from the OEM server(s) 136. The performance evaluation engine 622 may be configured for transmitting chipset information to the OEM server(s) 136 via the transceivers 616, and receiving, from the OEM server(s) 136, signal strength information indicative of signal strength value.

The performance evaluation engine 622 may also be configured to evaluate whether the signal strength value is below a predetermined threshold, by comparing any signal strength values received from the OEM server(s) 136 to one or more predetermined nominal (and/or expected) signal strength values stored in the RAM 604 and/or the ROM 122. A lookup table (not shown), against which the observed signal strength may be compared, can save expected/nominal values given particular combinations of device hardware (chipsets), geographic, time, atmospheric, or other conditions.

The performance correction engine 624 may be configured to perform remediation steps to abate any hardware performance deficiencies identified by the performance evaluation engine 622. For example, the performance correction engine 624 may issue commands, via the processor(s) 610, to one or more device components on the mobile device 104. The command(s) may alter one or more device settings associated with the hardware performance deficiency. As described in prior figures, the performance correction engine 624 may be the software mechanism configured for changing operational characteristics of the mobile device components with the altered device setting(s). As an example, the performance correction engine 624 may change device settings such as, for example, cellular preferred settings, Wi-Fi settings, roaming settings, APN settings, MMS address settings, application additions and/or deletions, signal strength settings, and many others.

The RAM 604 may include working memory that stores information such as an operating system 606, and other data 608. The other data 608 may include application(s) such as voice calling clients, VoLTE calling clients, Wi-Fi calling clients, messaging applications, email applications, media player applications, video calling applications, video chat applications, web browsers, social media applications, any sort of real-time communication applications, or any other sort of applications. The application(s) embodied as the other data 608 may engage in communication with other applications, servers, or devices via a communication link over a network (e.g., the cellular network(s) 108 and/or the Wi-Fi network(s) 110, sending and receiving data packets.

The ROM 122 and the RAM 604 can include non-transitory computer-readable media (which may be non-volatile and volatile, respectively), and may include removable and non-removable tangible, physical media implemented in technology for storage of information, such as computer readable instructions, data structures, program modules, or other data. System memory 602 (and the removable storage 516 and non-removable storage 518 as shown in FIG. 5) are examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the mobile device 104. Any such non-transitory computer-readable media may be part of the mobile device 104, the network server(s) 102, and/or other components of the infrastructure 100.

The mobile device 104 may further include the processor(s) 610. The performance evaluation engine 622 and/or the performance correction engine 624 are described in some aspects, as performing various steps, making determinations, etc. It should be appreciated that, in all cases, the performance evaluation engine 622 and the performance correction engine 624 perform all steps and actions via the processor(s) 610, and more precisely, via instructions executed by the processor(s) 610. In some implementations, the processor(s) 610 may be one or more central processing units (CPUs), graphics processing units (GPUs), or both CPUs and GPUs, or any other sort of processing unit.

The mobile device 104 may further include one or more interfaces 612, a display 614, transceivers 616, output device(s) 618, and input device(s) 620. In some implementations, the transceivers 616 may include radios and/or modems, or combinations thereof known in the art. For example, the transceivers 616 may include one or more radio transceivers that performs the function of transmitting and receiving radio frequency communications via an antenna (not shown). The radios and/or modems may facilitate wireless connectivity between the mobile device 104 and various devices or one or more networks (e.g., the cellular network(s) 108 and/or the Wi-Fi network(s) 110. In addition, the transceivers 616 may include a near field antenna for communicating over unlicensed wireless IF networks, such as local wireless data networks and personal area networks (e.g., Bluetooth or near field communication (NFC) networks). Further, the transceivers 616 may include wired communication components, such as an Ethernet port, that connect the mobile device 104 in a wired fashion to devices of one or more networks. In various implementations, the transceivers 616 may interface with and be controlled by a radio chipset (not shown).

In some implementations, the output devices 618 include any sort of output devices known in the art, such as a display (e.g., a liquid crystal display), speakers, a vibrating mechanism, or a tactile feedback mechanism. Output devices 618 also include ports for one or more peripheral devices, such as headphones, peripheral speakers, or a peripheral display.

In various implementations, input device(s) 620 include any sort of input devices known in the art. For example, input device(s) 620 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

What is claimed is:

1. A method comprising:
executing, via a processor of a mobile device, one or more instructions stored in a read-only memory (ROM) of the mobile device to cause the processor to perform a first device performance evaluation associated with one or more services on the mobile device, the one or more services comprising a short message service (SMS), a multimedia messaging service (MMS), a voice calling service, and a mobile data service;

identifying a hardware performance deficiency, via the processor, based at least in part on the first device performance evaluation;

issuing at least one command, via the processor, to a device component on the mobile device, the device component associated with the one or more services on the mobile device, the at least one command configured to alter, as an altered device setting, a device setting associated with the hardware performance deficiency;

changing an operational characteristic of a component with the altered device setting;

performing, via the processor, a second device performance evaluation associated with the one or more services on the mobile device;

determining, based at least in part on the second device performance evaluation, whether the hardware performance deficiency is abated; and generating a message to a network server indicative of a connectivity failure when the hardware performance deficiency is not abated.

2. The method of claim 1, further comprising:

based at least in part on determining that the hardware performance deficiency is not abated, issuing, via the processor, a command to the network server associated with the one or more services on the mobile device to alter at least one network setting;

performing, via the processor, a third device performance evaluation associated with the one or more services on the mobile device;

determining, based at least in part on the third device performance evaluation, whether the hardware performance deficiency is abated; and generating the message to the network server indicative of the connectivity failure when the hardware performance deficiency is not abated, the message comprising a help ticket.

3. The method of claim 2, wherein the command issued by the processor to the network server to alter the at least one network setting comprises an instruction to stop and restart one or more of the voice calling service and the mobile data service at the network server.

4. The method of claim 3, wherein the command issued by the processor to the network server to alter the at least one network setting comprises an instruction to:

access a roaming setting on the mobile device from the network server; and change at east one roaming setting on the mobile device via the network server.

5. The method of claim 1, wherein the hardware performance deficiency comprises a signal strength value indicative of a signal strength connecting the mobile device to a wireless network.

6. The method of claim 5, wherein the device component is a transceiver associated with the one or more services on the mobile device, the processor configured to identify the hardware performance deficiency by:

executing an application programming interface (API) that causes the transceiver to transmit a signal strength modification request to an original equipment manufacturer (OEM) server;

receiving, via the processor, a request for signal information from the OEM server, the signal information indicative of the signal strength value;

transmitting the signal information to the OEM server; and receiving, from the OEM server, signal strength information indicative of the signal strength value; and evaluating whether the signal strength value is below a predetermined threshold.

7. The method of claim 6, wherein the at least one command configured to alter the device setting associated with the hardware performance deficiency is a command to the transceiver, the command enabling a cellular preferred setting on the mobile device that configures the device for a Wi-Fi connection.

8. The method of claim 1, wherein the hardware performance deficiency comprises a lack of data connectivity due to an invalid access point name (APN) setting on the mobile device.

9. The method of claim 8, wherein the device component is a memory location associated with the APN setting associated with the one or more services on the mobile device, the processor configured to identify the hardware performance deficiency by:

determining whether a connection error is caused by the APN setting by transmitting, via a transceiver, a request for a new APN address associated with the mobile device;

receiving a response indicative of the new APN address; and comparing, via the processor, the new APN address to a current APN address setting on the mobile device.

10. The method of claim 9, wherein the at least one command configured to alter the device setting associated with the hardware performance deficiency is a command to the transceiver, the command configured for:

modifying the memory location associated with the current APN address setting by saving the new APN address to the memory location; and restarting an APN service.

11. The method of claim 1, wherein the hardware performance deficiency comprises at least one erroneous MMS message on the mobile device.

12. The method of claim 11, wherein the device component is call system associated with the one or more services on the mobile device, the processor configured to identify the hardware performance deficiency by:

transmitting a request for an MMS address;

receiving, via a transceiver, a new MMS address responsive to the request for the MMS address;

modifying a memory location associated with the MMS setting by saving the new MMS address to the memory location; and restarting the MMS on the mobile device.

13. A system comprising:

a mobile device comprising a processor and a read only memory (ROM), the ROM storing one or more instructions configured to cause the processor to:

execute a first device performance evaluation associated with one or more services on the mobile device, the one or more services comprising a short message service (SMS), a multimedia messaging service (MMS), a voice calling service, and a mobile data service;

identify a hardware performance deficiency based at least in part on the first device performance evaluation;

issue at least one command to a device component on the mobile device, the device component associated with the one or more services on the mobile device, the at least one command configured to alter, as an altered device setting, a device setting associated with the hardware performance deficiency;

change an operational characteristic of a component with the altered device setting;

perform a second device performance evaluation associated with the one or more services on the mobile device;

determine, based at least in part on the second device performance evaluation, whether the hardware performance deficiency is abated; and generate a message to a network server indicative of a connectivity failure when the hardware performance deficiency is not abated.

14. The system of claim 13, the one or more instructions further configured to:

based at least in part on determining that the hardware performance deficiency is not abated, issue, via the processor, a command to the network server associated with the one or more services on the mobile device to alter at least one network setting;

perform, via the processor, a third device performance evaluation associated with the one or more services on the mobile device;

determine, based at least in part on the third device performance evaluation, whether the hardware performance deficiency is abated; and generate the message to the network server indicative of the connectivity failure when the hardware performance deficiency is not abated, the message comprising a help ticket.

15. The system of claim 14, wherein the command issued by the processor to the network server to alter the at least one network setting comprises an instruction to stop and restart one or more of the voice calling service and the mobile data service at the network server.

16. The system of claim 15, wherein the command issued by the processor to the network server to alter the at least one network setting comprises an instruction to:

access a roaming setting on the mobile device from the network server; and change the roaming setting on the mobile device via the network server.

17. The system of claim 13, wherein the hardware performance deficiency comprises a signal strength value indicative of a signal strength connecting the mobile device to a wireless network.

18. The system of claim 17, wherein the device component is a transceiver associated with the one or more services on the mobile device, the processor configured to identify the hardware performance deficiency by:

executing an application programming interface (API) that causes the transceiver to transmit a signal strength modification request to an original equipment manufacturer (OEM) server;

receiving, via the processor, a request for signal information from the OEM server, the signal information indicative of the signal strength value;

transmitting the signal information to the OEM server;

receiving, from the OEM server, signal strength information indicative of the signal strength value; and evaluating whether the signal strength value is below a predetermined threshold.

19. The system of claim 18, wherein the at least one command configured to alter the device setting associated with the hardware performance deficiency is a command to the transceiver, the command enabling a cellular preferred setting on the mobile device that configures the device for a Wi-Fi connection.

20. A non-transitory computer-readable medium storing computer-executable instructions that, when executed by a processor of a mobile device, cause the processor to perform actions comprising:

performing a first device performance evaluation associated with one or more services on the mobile device, the one or more services comprising a short message service (SMS), a multimedia messaging service (MMS), a voice calling service, and a mobile data service;

identifying a hardware performance deficiency, via the processor, based at least in part on the first device performance evaluation;

issuing at least one command to a device component on the mobile device, the device component associated with the one or more services on the mobile device, the at least one command configured to alter, as an altered device setting, a device setting associated with the hardware performance deficiency;

changing an operational characteristic of a component with the altered device setting;

performing a second device performance evaluation associated with the one or more services on the mobile device;

determining, based at least in part on the second device performance evaluation, whether the hardware performance deficiency is abated; and generating a message to a network server indicative of a connectivity failure when the hardware performance deficiency is not abated.

* * * * *